(12) United States Patent
Lin

(10) Patent No.: US 8,315,059 B2
(45) Date of Patent: Nov. 20, 2012

(54) SCREW LESS FIXING ASSEMBLY FOR INTERFACE CARD

(75) Inventor: Te-Chang Lin, San Jose, CA (US)

(73) Assignee: Super Micro Computer Inc., San Jose, CA (US)

( * ) Notice: Subject to any disclaimer, the term of this patent is extended or adjusted under 35 U.S.C. 154(b) by 328 days.

(21) Appl. No.: 12/792,819

(22) Filed: Jun. 3, 2010

(65) Prior Publication Data

US 2011/0299254 A1 Dec. 8, 2011

(51) Int. Cl.
*H05K 1/00* (2006.01)

(52) U.S. Cl. ............ 361/748; 361/679.31; 361/679.33; 361/679.4; 361/740; 361/759; 361/760; 361/799; 174/384; 174/387; 439/64; 439/374; 439/377; 710/63

(58) Field of Classification Search ............ 361/748, 361/740, 759, 760, 799; 174/384, 387; 439/64, 439/374, 377; 710/63
See application file for complete search history.

(56) References Cited

U.S. PATENT DOCUMENTS

| 5,287,460 | A * | 2/1994 | Olsen et al. ............ 710/63 |
| 6,483,107 | B1 * | 11/2002 | Rabinovitz et al. ............ 250/239 |
| 6,623,278 | B2 * | 9/2003 | Follingstad et al. ............ 439/64 |
| 7,042,737 | B1 * | 5/2006 | Woolsey et al. ............ 361/799 |
| 2005/0231924 | A1 * | 10/2005 | Shih ............ 361/759 |
| 2008/0132107 | A1 * | 6/2008 | Chang ............ 439/377 |

* cited by examiner

*Primary Examiner* — Xiaoliang Chen
(74) *Attorney, Agent, or Firm* — Chun-Ming Shih; HDLS IPR Services

(57) ABSTRACT

A screw-less fixing assembly for an interface card having a fixing support includes a frame, a movable cover module and an elastic member. The frame has an I/O opening. One side of the I/O opening is provided with an accommodating space. A long plate of the fixing support is positioned to correspond to the I/O opening, and a short plate of the fixing support is received in the accommodating space. The movable cover module is mounted in the accommodating space. The elastic member has an elastic protrusion positioned to correspond to the short plate of the fixing support. The movable cover module is moved to drive the elastic protrusion to tightly fix the short plate of the fixing support to the frame. With this arrangement, the interface card can be rapidly detached from the frame or attached thereto without using screws.

7 Claims, 12 Drawing Sheets

SCREW LESS FIXING ASSEMBLY FOR INTERFACE CARD

BACKGROUND OF THE INVENTION

1. Field of the Invention

The present invention relates to a fixing assembly for an interface card, and in particular to a screw-less fixing assembly for an interface card.

2. Description of Prior Art

With the advancement of science and technology, computers have played an important role in daily life of modern people. Thus, various interface cards are developed for personal computers and computer systems (e.g. servo computers) to thereby support or expand the functions of the computer system. Conventionally, the interface card is fixed to a support by screws, thereby fixing the interface card to a computer casing.

However, since the interface card is an exchangeable component in the computer system, a user may frequently detach the interface card from the computer casing according to practical demands. Thus, fixing the interface card by screws makes the user inconvenient to carry out the detachment of the interface card because he/she needs a tool (such as a screw driver) to loosen the screws. The screws may be lost after detachment. Even, the screw may fall in the computer casing to cause a short circuit therein.

On the other hand, tens of interface cards may be usually mounted in a large-sized computer casing. It takes a lot of time and labor hours for the user to detach every interface card by loosening the screws. Of course, the time and labor hours for assembling the plurality of interface cards in a large-sized computer casing will be also increased. Therefore, for the industry in this field, it is necessary to develop a screw-less fixing assembly whereby a user can rapidly detach a plurality of interface cards from the computer casing or attach them thereto.

Therefore, it is an important issue for the present inventor to solve the above-mentioned problems.

SUMMARY OF THE INVENTION

The present invention is to provide a screw-less fixing assembly for an interface card, whereby a user can fix the interface card merely by a pressing action without using any screws, thereby reducing the assembly time for the interface card.

The present invention is to provide a screw-less fixing assembly for an interface card. The interface card has a fixing support. The fixing assembly includes: a frame provided with an I/O opening, one side of the I/O opening being provided with an accommodating space, the fixing support being formed into an L shape and having a long plate and a short plate connected to the long plate, the long plate of the fixing support being positioned to correspond to the I/O opening, and the short plate being received in the accommodating space; a movable cover module mounted in the accommodating space to correspond to the short plate of the fixing support; and an elastic member having an elastic protrusion, the elastic member being fixed to the movable cover module and the elastic protrusion being positioned toward the short plate of the fixing support; wherein the movable cover module is moved to drive the elastic protrusion to press and fix the short plate of the fixing support when the fixing support is mounted in the frame.

According to an embodiment of the present invention, the movable cover module comprises a lower base inserted into the frame and an upper base for linearly sliding with respect to the lower base.

In comparison with prior art, the present invention has advantages as follows.

Since the elastic member is fixed to the upper base of the movable cover module and the elastic protrusion is positioned to correspond to the short plate of the fixing support, the user only needs to press the upper base downwards into the accommodating space, so that the elastic member can tightly secure the fixing support with its elastic deformation. With the elastic protrusion tightly abutting the short plate of the fixing support, the interface card can be fixed to the frame. When the user intends to detach the interface card from the frame, the user only needs to pull upwards the upper base out of the accommodating space, whereby the fixing support can be disengaged from the elastic member and thus detached from the frame. Therefore, according to the present invention, the user can detach the interface from the frame or attach it thereto without using tools or screws, so that the operation becomes much easier and the time for assembling the interface card to the frame can be reduced.

The elastic member is fixed to the upper base of the movable cover module and the elastic protrusion is positioned to correspond to the short plate of the fixing support. Furthermore, the number of the elastic members can be varied based on the number of the fixing supports. Therefore, the user can simultaneously detach several interface cards from the frame or attach them thereto. As for a large-scale computer casing having a number of interface cards, the present invention can reduce the time for assembly and maintenance.

Since the present invention is not provided with screws, the problem in prior art that the screws may be lost or fall into the casing to cause a short circuit can be eliminated.

Since the upper base of the movable cover module can pivot with respect to the lower base toward the outside of the frame, the pivoting of the upper base generates a path allowing the fixing support to move upwards out of the accommodating space. Thus, the interference generated when detaching a plurality of interface cards from the frame can be prevented.

DETAILED DESCRIPTION OF THE INVENTION

The characteristics and technical contents of the present invention will be described with reference to the accompanying drawings. However, the drawings are illustrative only but not used to limit the present invention.

Figure 1:
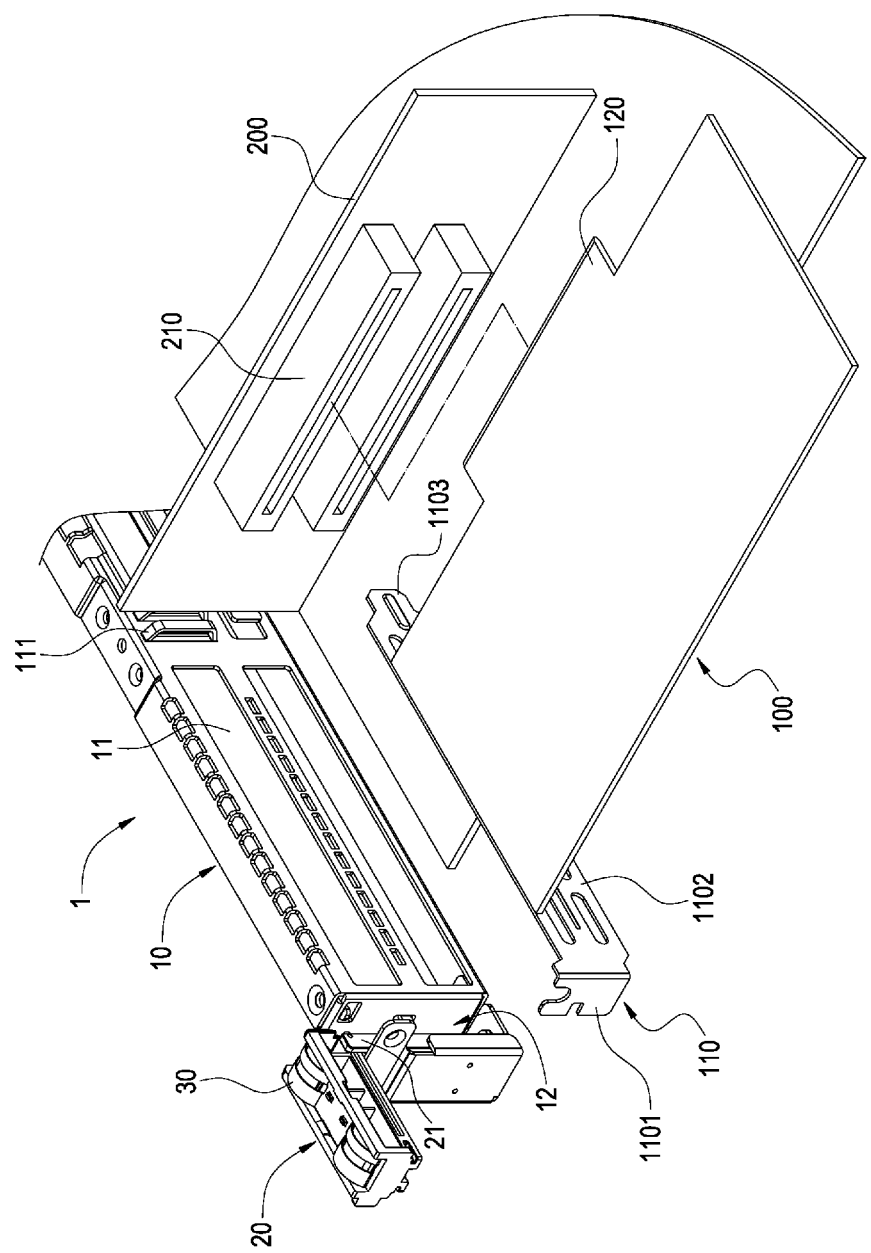
FIG. 1 is a schematic view showing that an interface card is to be fixed by the present invention.

Please refer to FIG. 1. The present invention provides a screw-less fixing assembly 1 for an interface card (referred to as "fixing assembly 1" hereinafter). The fixing assembly 1 is used to fix an interface card 100.

As seen from FIG. 1, one side of the interface card 100 has a fixing support 110, and one side of the interface card 100 adjacent to the fixing support 110 has a terminal portion 120 (i.e. so-called "golden finger"). The terminal portion 120 of the interface card 100 is to be inserted into an insertion slot 210 of an adaptor plate 200 for electrical connection. The fixing support 110 of the interface card 100 is fixed by the fixing assembly 1 of the present invention.

The fixing support 110 is usually formed into an L shape and has a short plate 1101, a long plate 1102 bent from the short plate 1101, and a tab 1103 extending from the distal end of the long plate 1102 away from the short plate 1101. Since the dimensions of the interface card 100 and the fixing support 110 are changeable, the dimension of the fixing assembly 1 of the present invention can be also changed to correspond to the dimension of the used interface card 100. The following description aims to explain the structural characteristics of the present invention only, but not to limit the dimension of the fixing assembly 1 to a specific value.

The fixing assembly 1 of the present invention includes a frame 10 and a moveable cover assembly 20 received in the frame 10.

The frame 10 is elongate and provided with at least one I/O opening 11 and an accommodating space 12 adjacent to the I/O opening 11. As seen from FIG. 1, the I/O opening 11 of the frame 10 is also elongate to correspond to the long plate 1102 of the fixing support 110. A holder 111 is formed adjacent to the I/O opening 11. With the tab 1103 being inserted into the holder 111 near the I/O opening 11, the long plate 1102 covering the I/O opening 11 and the short plate 1101 abutting the inner wall of the accommodating space 12, the fixing support 110 can be fixed to the frame 10. In other words, the long plate 1102 of the fixing support 110 is positioned to correspond to the I/O opening 11, and the short plate 1101 of the fixing support 110 is received in the accommodating space 12. Conventionally, the short plate 1101 of the fixing support 110 and thus the whole interface card 100 are fixed to the frame 10 by screws. However, in the present invention, the short plate 1101 is not fixed to the frame 10 by screws but by the movable cover module 20 (later described).

The accommodating space 12 is formed on one side of the I/O opening 11. More specifically, the accommodating space 12 is formed on the side of the I/O opening 11 on which the short plate 1101 of the fixing support 110 covers the I/O opening 11. The accommodating space 12 is configured to receive the movable cover module 20. The frame 10 is provided with two open surfaces around the accommodating space 12. One of the open surfaces oriented toward the same direction as that of the I/O opening 11 allows the short plate 1101 of the fixing support 110 to abut the accommodating space 12 or leave there from smoothly. The other open surface oriented upwards allows the movable cover module 20 to be inserted into or removed from the accommodating space 12.

Figure 2:
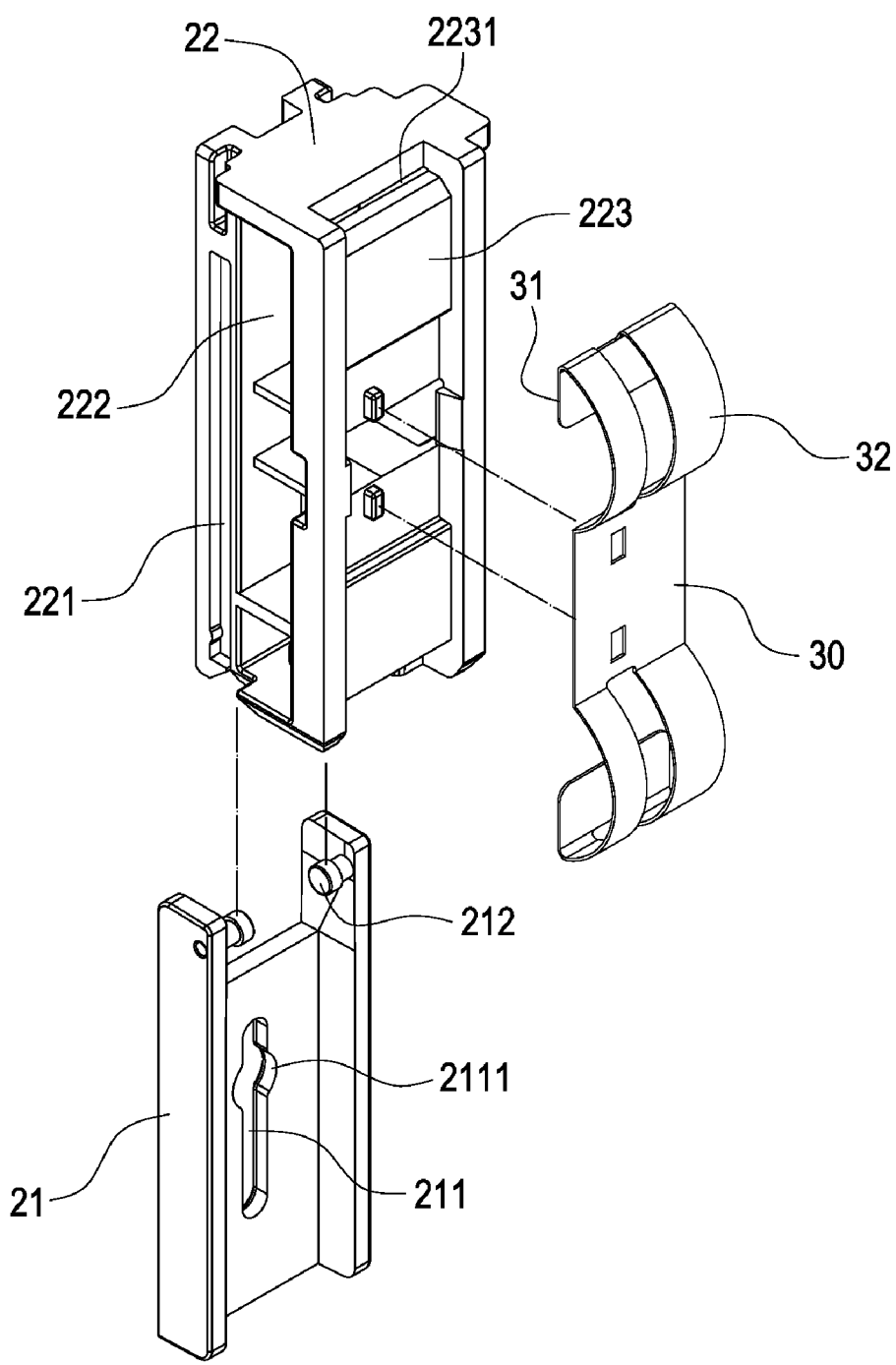
FIG. 2 is an exploded perspective view showing a movable cover module of the present invention.
Figure 3:
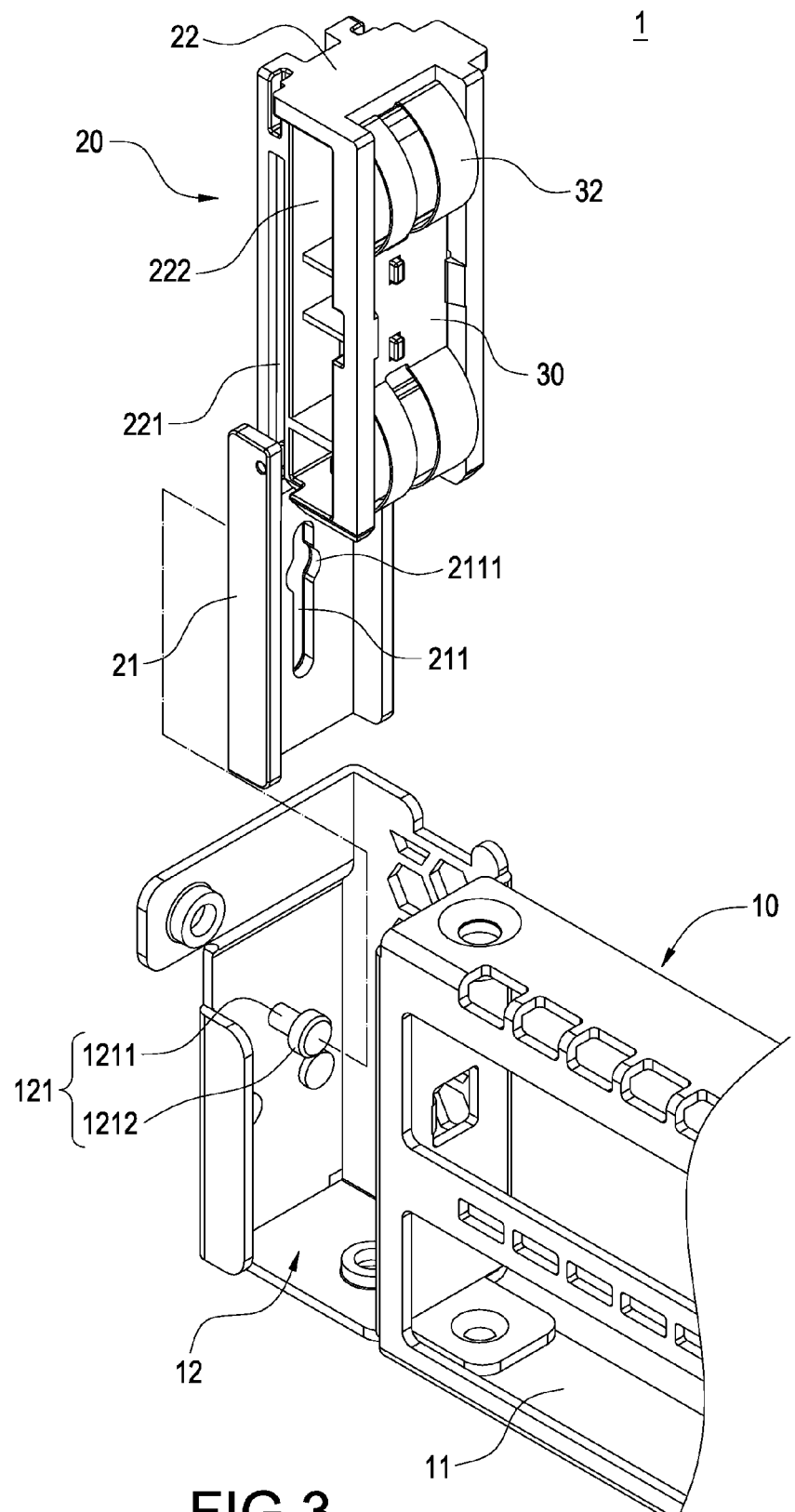
FIG. 3 is an exploded perspective view showing the movable cover module of the present invention and a frame.
Figure 4:
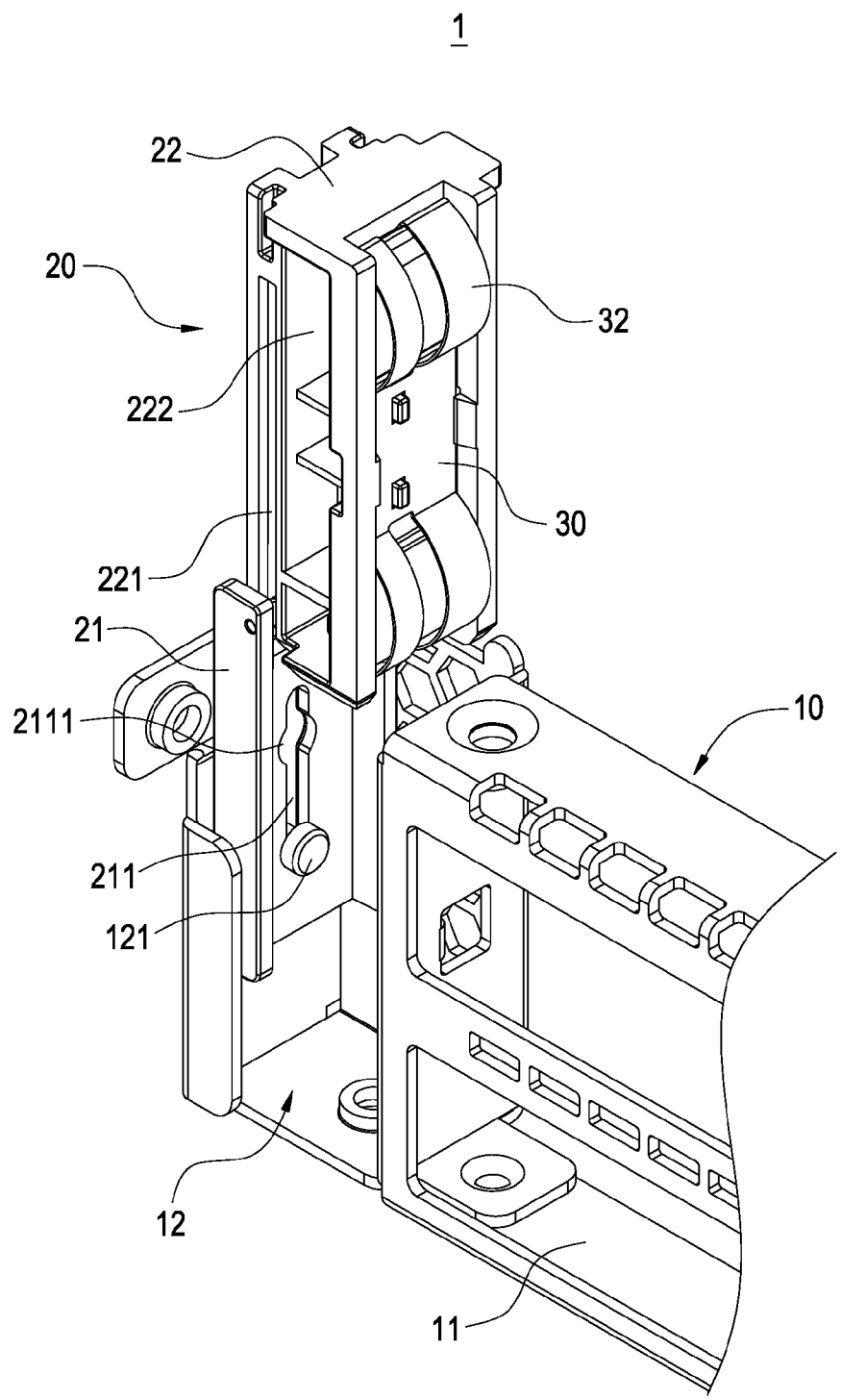
FIG. 4 is an assembled perspective view showing the movable cover module of the present invention and the frame.

Please refer to FIGS. 2 to 4. The movable cover module 20 of the present invention includes a lower base 21 and an upper base 22. The lower base 21 is substantially formed into a plate-like shape and provided with a slot 211 on its surface. The top of each side of the lower base 21 is provided with a pivot 212. The inner wall of the accommodating space 12 is provided with a post 121 (as shown in FIG. 3). The post 121 has a straight portion 1211 and an enlarged portion 12112 formed on the distal end of the straight portion 1211. The outer diameter of the enlarged portion 1212 is larger than that of the straight portion 1211. The post 121 is inserted into the slot 211 of the lower base 21. The middle section of the slot 211 is provided with an enlarged hole 2111 whose inner diameter is slightly larger than the outer diameter of the straight portion 1211. The width of the remaining portion of the slot 211 is smaller than the diameter of the enlarged portion 2111 but still larger than the width of the straight portion 1211 of the post 121. Thus, the post 121 can be smoothly inserted into the slot 211. The distance of the lower base 21 sliding in the accommodating space 12 is restricted to the length of the slot 211. On the other hand, since the slot 211 has the enlarged hole 2111, the lower base 21 can be detachably connected to the post 121 of the accommodating space 12 and slide upwards or downwards with respect to the accommodating space 12.

The upper base 22 is substantially formed into a rectangular block. Both sides of the upper base 22 are provided with a groove 221 respectively to correspond to the pivots 212 of the lower base 21. With this arrangement, the upper base 22 can slide linearly with respect to the lower base 22 and the sliding distance is identical to the length of the groove 221. Both side surfaces of the upper base 22 are provided with a hollowed portion 222 adjacent to the groove 221. The hollowed portion 222 is configured to conserve materials and used as a point at which a user can grip the upper base 22 easily, so that the user can pull the upper base 22 out of the accommodating space 12 or press the upper base 22 into the accommodating space 12.

Figure 5:
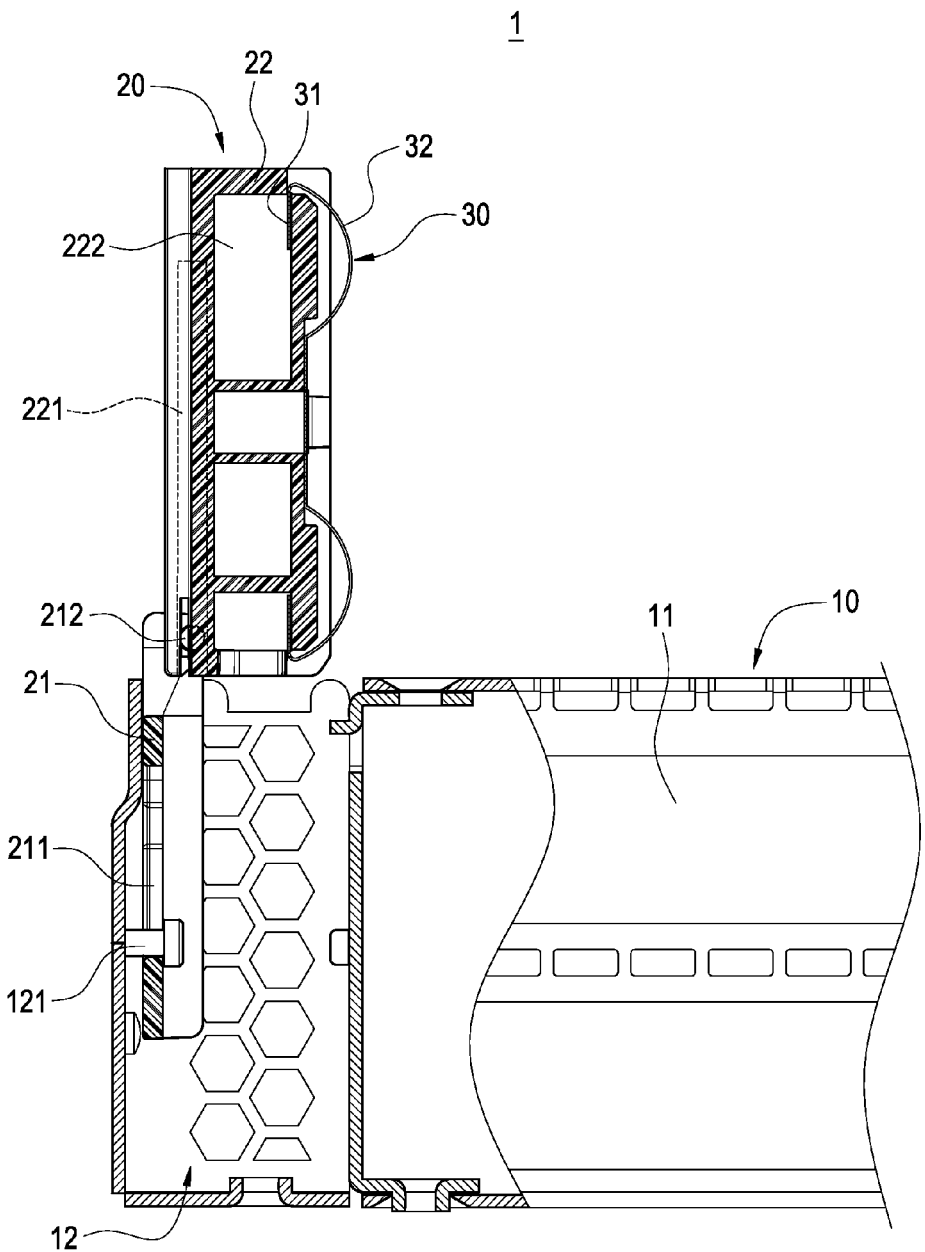
FIG. 5 is a side cross-sectional view of FIG. 4.
Figure 6:
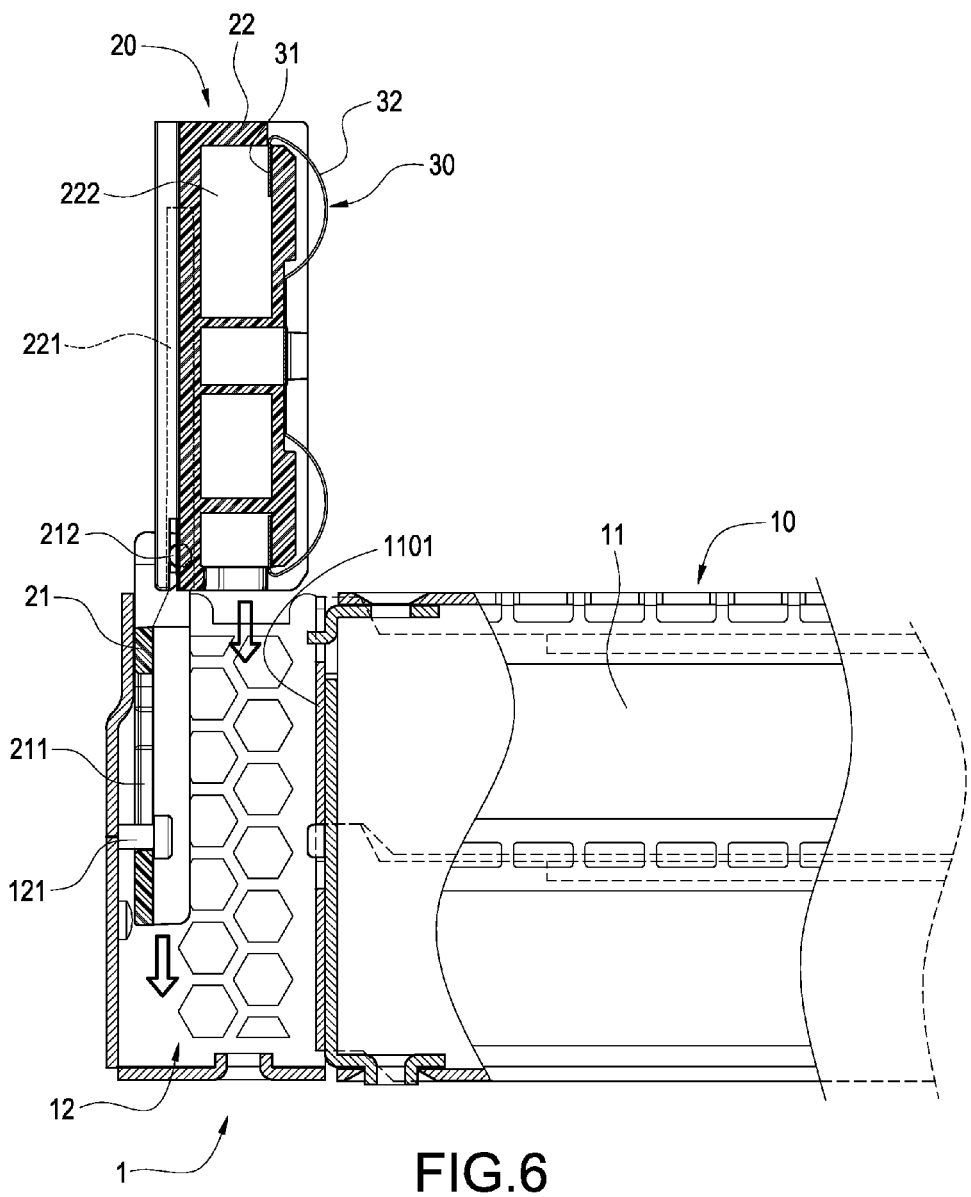
FIG. 6 is a side cross-sectional view showing that the movable cover module of the present invention is to be inserted into an accommodating space of the frame.
Figure 7:
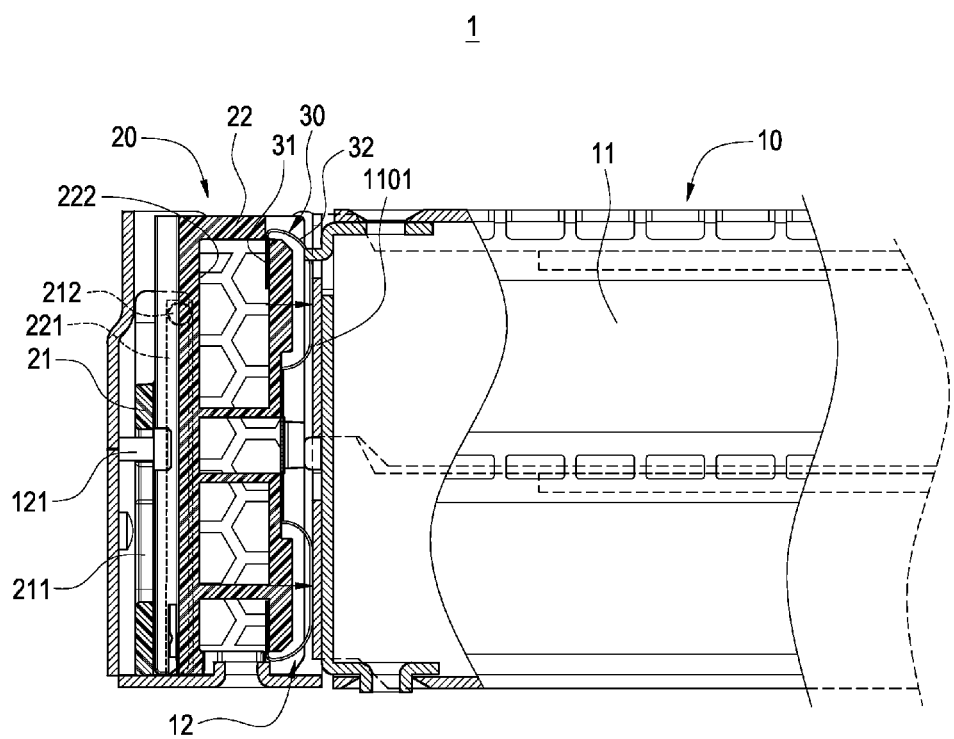
FIG. 7 is a side cross-sectional view showing that the movable cover module of the present invention has been inserted into the accommodating space of the frame.

FIG. 4 and FIG. 5 are a perspective view and a side cross-sectional view showing the combination of the lower base 21 and the upper base 22 is to be inserted into the accommodating space 12. At this time, the user can press the upper base 22 into the accommodating space 12. The upper base 22 is moved to drive the lower base 21 to move downwards together (indicated by arrows in FIG. 6) until the post 121 reaches the upper end of the slot 211 of the lower base 21. At this time, the upper base 22 can slide downwards further toward the lower base 21 until the pivots 212 of the lower base 21 reach the top of the grooves 221 of the upper base 22 respectively. With the proper design in the dimensions of the lower base 21 and the upper base 22, the upper base 22 can contact the inner bottom wall of the accommodating space 12 (as shown in FIG. 7).

Figure 8:
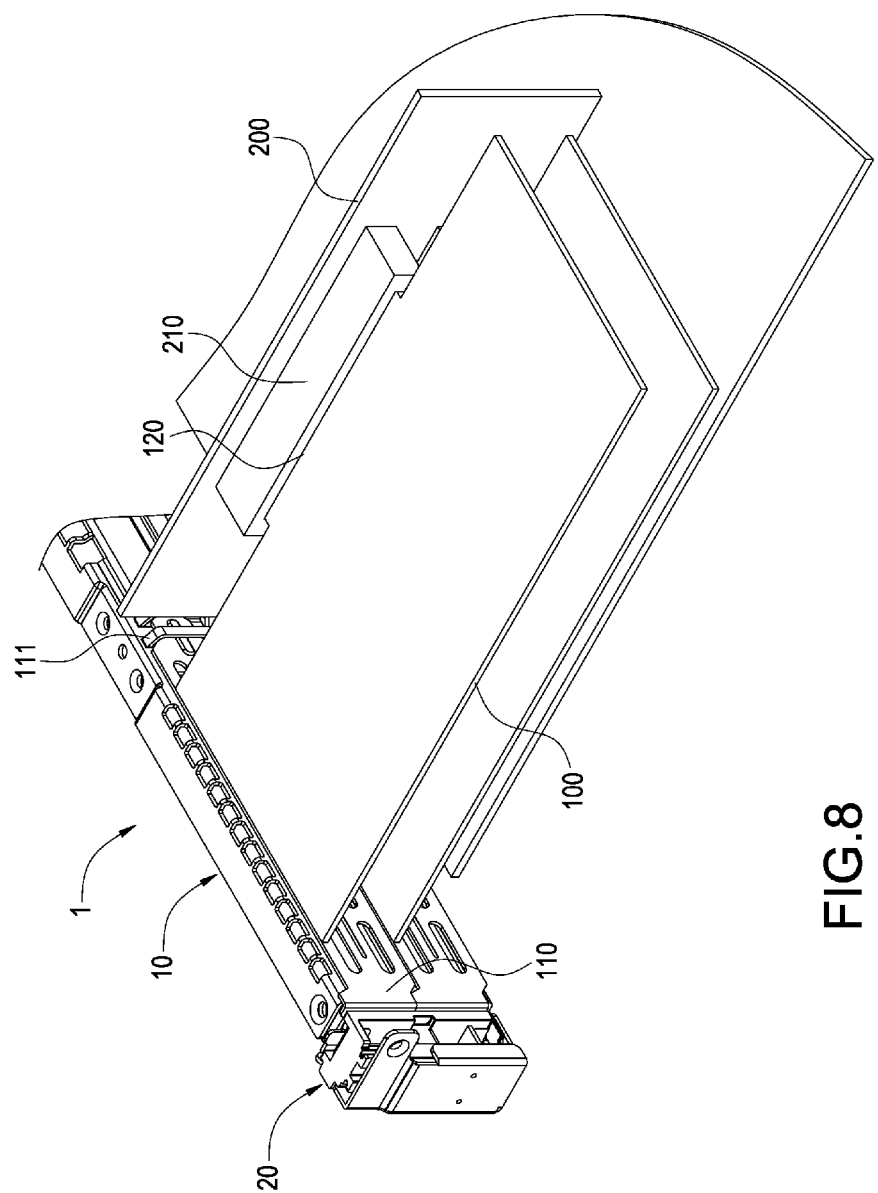
FIG. 8 is a schematic view showing that interface cards have been fixed by the present invention.

Please refer to FIGS. 2 and 3 again. A surface 223 of the upper base 22 is provided with an elastic member 30 for abutting the short plate 1101 of the fixing support 110, thereby avoiding the usage of screws. As seen in FIG. 2, the elastic member 30 has two hooks 31 and two elastic protrusions 32. The hooks 31 are inserted into insertion slots 2231 provided on the surface 223 of the upper base 22, thereby fixing the elastic member 30 to the surface 223 of the upper base 22. As shown in FIG. 7, the elastic protrusion 32 is positioned to correspond to the short plate 1101 of the fixing support 110. In this way, each elastic protrusion 32 abuts the short plate 1101 of the fixing support 110 when the upper base 22 is completely inserted into the accommodating space 12, thereby elastically abutting the short plate 1101 of the fixing support 110 against the inner wall of the accommodating space 12. FIG. 8 shows that two interface cards 100 are fixed by the fixing assembly 1 of the present invention.

In the present embodiment, although two I/O openings 11 are provided on the frame 10 and two interface cards 100 can be fixed to the frame 10 because the elastic member 30 provided on the upper base 22 has two corresponding elastic protrusions 32, the present invention is not limited thereto. The height of the frame 10 and the number of the I/O openings 11 can be changed according to practical demands. Alternatively, the upper base 22 is provided with at least one elastic member 30 as long as the number and locations of the elastic protrusions 32 correspond to the number and locations of the short plates 1101 of the fixing support 110.

Next, pleaser refer to FIGS. 9 to 12, which show how the fixing support of the interface card 100 is fixed by the fixing assembly 1 of the present invention.

Figure 9:
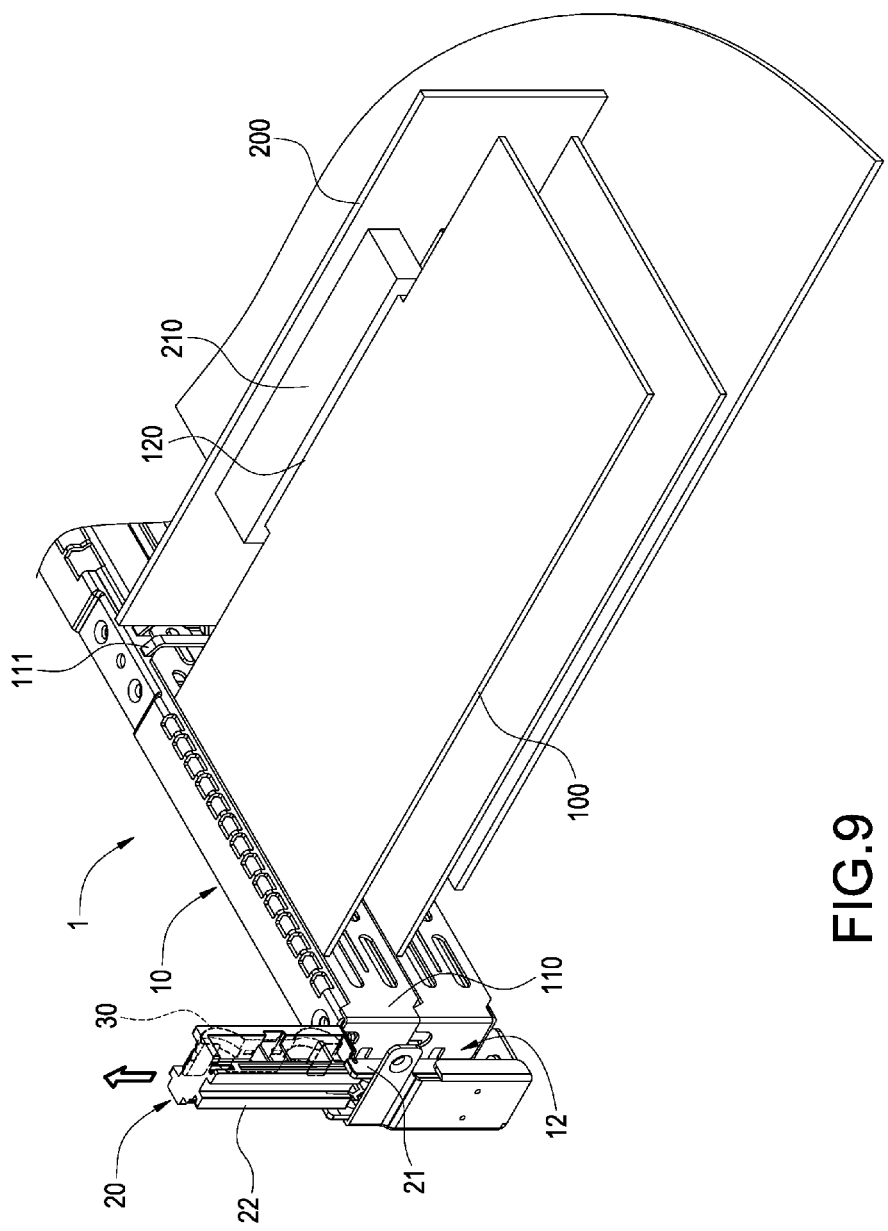
FIG. 9 is a schematic view showing an upper base of the movable cover module is pulled out of the accommodating space of the frame.

As shown in FIG. 9, when the user intends to detach the interface card 100 from the frame 10, the user has to pull the upper base 22 out of the accommodating space 12 (indicated by the arrows). As a result, the upper base 22 slides upwards with respect to the lower base 21 until the pivots 212 of the lower base 21 reach the bottom ends of the grooves 221 on both sides of the upper base 22. At this time, the upper base 22 cannot slide with respect to the lower base 21 any further but the user can still pull upwards the upper base 22 because the pivots 212 of the lower base 21 are inserted into the grooves 221 of the upper base 22. Thus, the upper base 22 can still drive the lower base 21 to slide upwards to leave the accommodating space 12. As mentioned in the above, the distance of the lower base 21 sliding with respect to the accommodating space 12 is identical to the length of the slot 211 of the lower base 21. It should be noted that when the upper base 22 leaves the accommodating space 12 completely, the elastic member 30 is disengaged from the short plate 1101 of the fixing support 110. At this time, it is ready for the user to detach the interface card 100 from the frame 10.

As seen from FIG. 9, when the user intends to detach the interface card 100 from the frame 10, the user needs to pull the terminal portion 120 out of the insertion slot 210 of the adaptor plate 200. Therefore, it is necessary to provide a path for the interface card 100 to be removed from the frame 10. To this end, according to the present invention, not only the upper base 22 must slide with respect to the lower base 21 to leave the accommodating space 12, but also the upper base 22 must pivot outwards with respect to the lower base 21 to generate a vertical distance for the detachment of the interface card 100.

Figure 10:
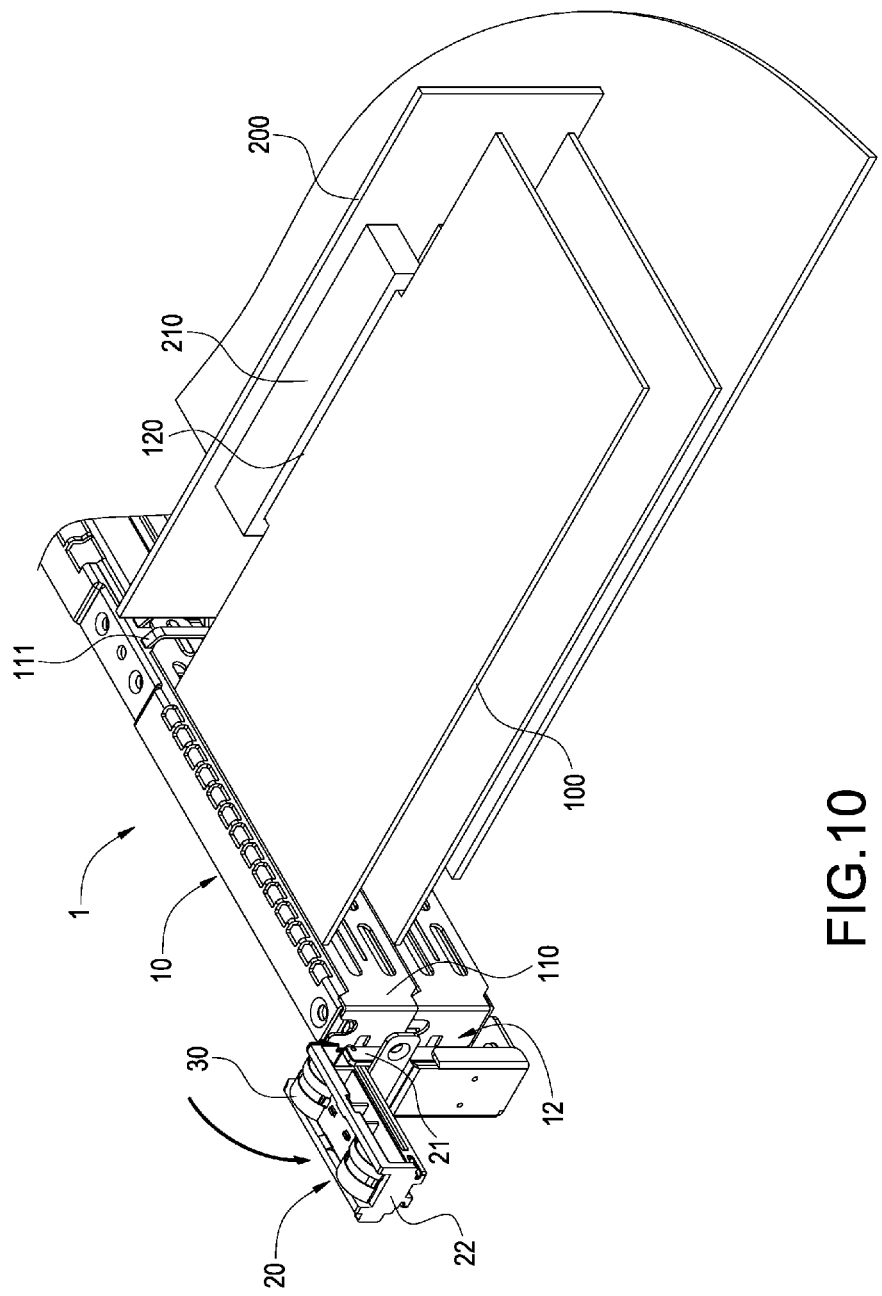
FIG. 10 is a schematic view showing the pivoting of the upper base of the movable cover module with respect to the lower base toward the outside of the frame.
Figure 11:
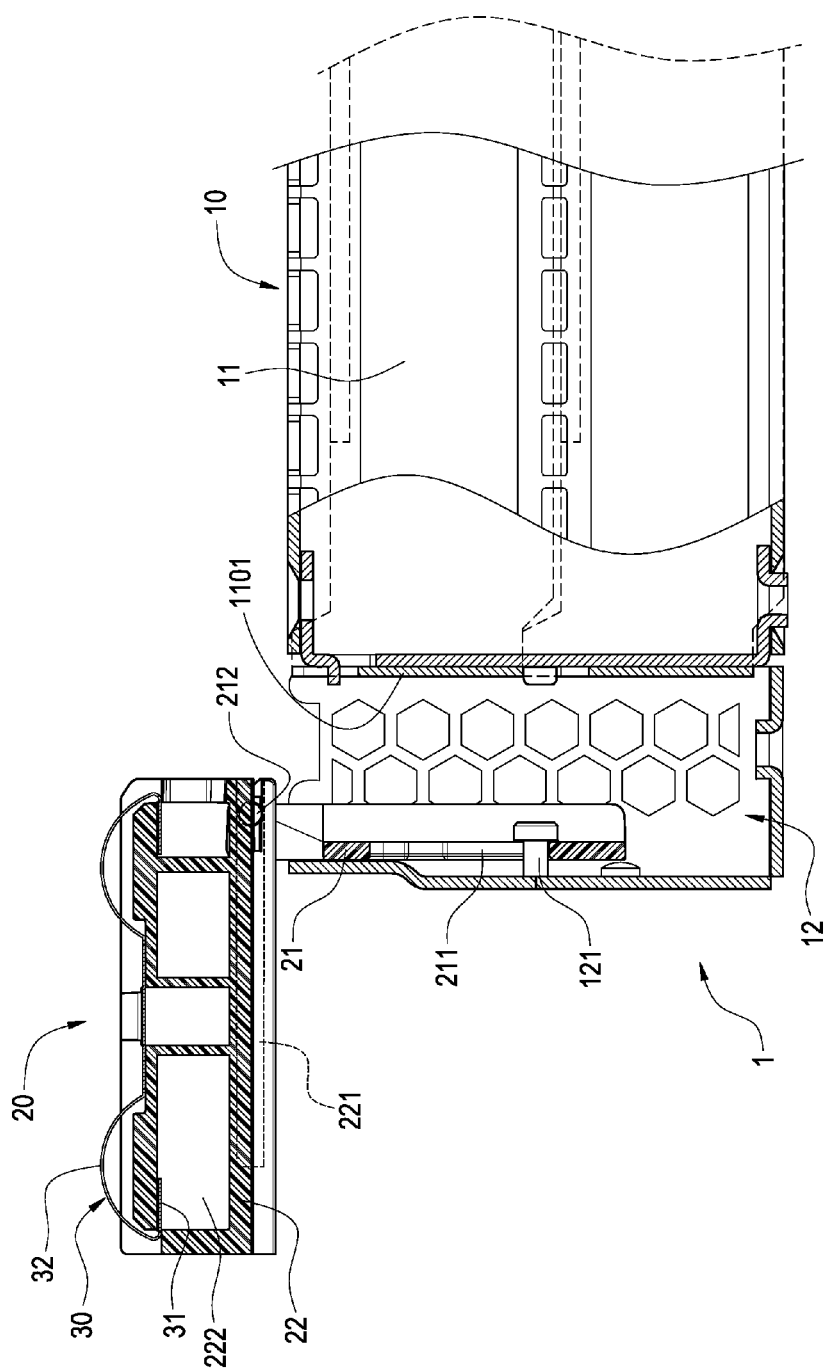
FIG. 11 is a side cross-sectional view of FIG. 10.

To this end, the length of the slot 211 of the lower base 21 and the length of the grooves 221 of the upper base 22 are designed in such a manner that the lower end of the upper base 22 can be removed from the accommodating space 12 completely when the lower base 21 leaves the accommodating space 12. As shown in FIGS. 10 and 11, at this time, the upper base 22 pivots outwards with respect to the lower base 21 by using the pivots 212 of the lower base 21 as the center of rotation, thereby pivoting toward the outside of the frame 10. In this way, a portion of the accommodating space 12 can be spared to allow the terminal portion 120 of the interface card 100 to be pulled out of the insertion slot 210 of the adaptor plate 200. The short plate 1101 can move in the spared portion of the accommodating space 12 (as shown in arrows in FIG. 12), so that the user can pull the interface card 100 out of the frame 10 smoothly.

On the other hand, since the upper base 22 has pivoted toward the outside the frame 10 and the accommodating space 12 has two open surfaces, these two open surfaces help the short plate 1101 to leave the accommodating space 12.

Figure 12:
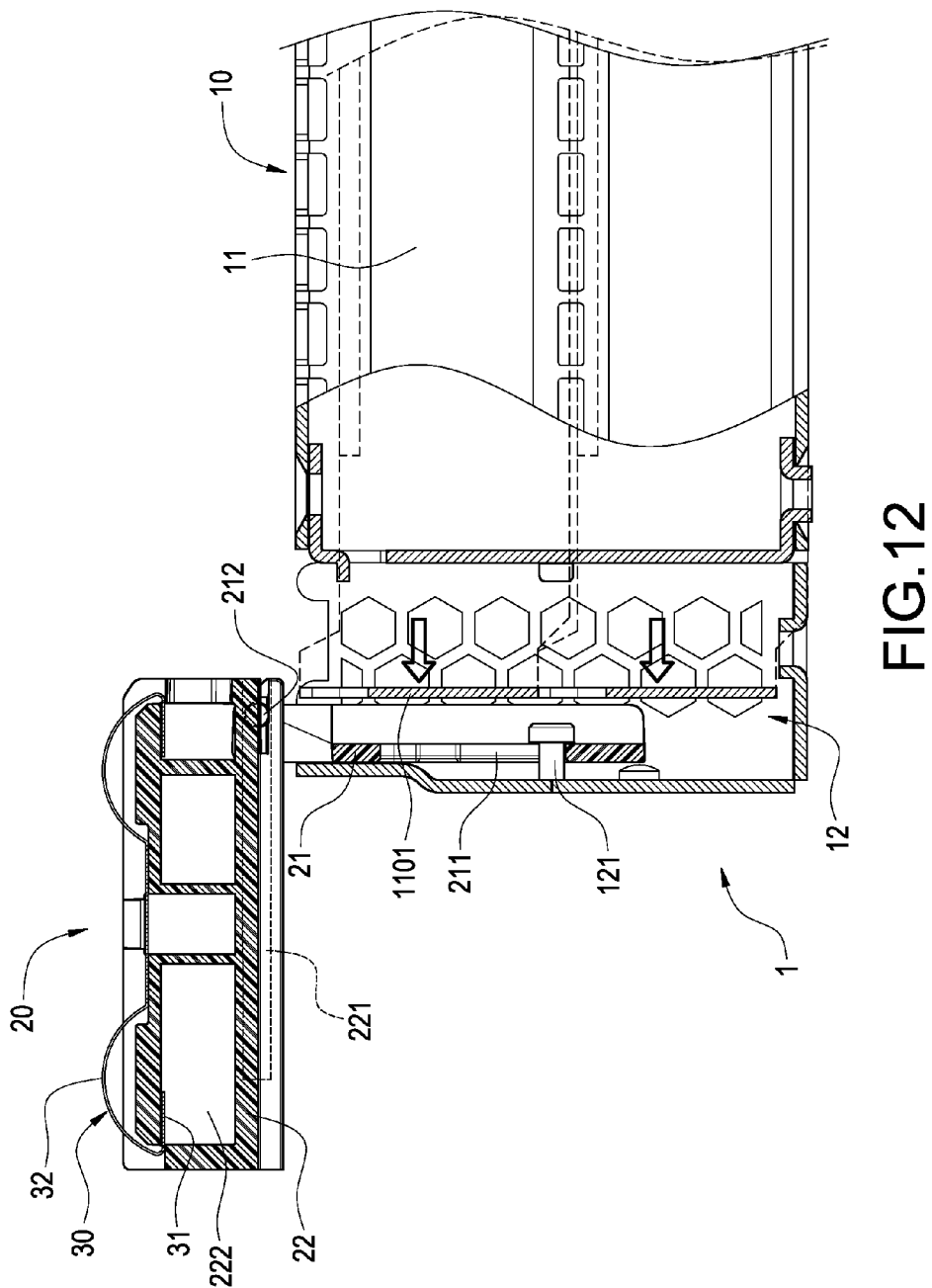
FIG. 12 is a side cross-sectional view showing the interface card is detached from an I/O opening.

The accommodating space 12 can be designed to allow for the insertion of the movable cover module 20 and the detachment of the fixing support 110. In addition, the inner wall of the accommodating space 12 is provided with a plurality of honeycombed perforations 122 (as shown in FIG. 12). The size of the perforation 122 is not larger than 5 centimeters. The perforations 122 are configured to break the electromagnetic waves generated by the interface card 100, thereby protecting the interference of electromagnetic waves. On the other hand, the perforations 122 allow external air to flow into the accommodating space 12 for heat dissipation.

In the previous embodiment, the movable cover module 20 is constituted of the lower base 21 and the upper base 22. The movable cover module 20 may be integrally formed as a single unit as long as the elastic member 30 can be fixed to the movable cover module 20, the movable cover module 20 can slide vertically in the accommodating space 12 with respect to the frame 10, and the elastic member 30 is configured to tightly abut the short plate 1101 of the fixing support 110.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A screw-less fixing assembly for an interface card, the interface card having a fixing support, the fixing assembly comprising:

a frame having an I/O opening, one side of the I/O opening being provided with an accommodating space, the fixing support being formed into an L shape and having a long plate and a short plate connected to the long plate, the long plate of the fixing support being positioned to correspond to the I/O opening, the short plate of the fixing support being received in the accommodating space;

a movable cover module mounted in the accommodating space to correspond to the short plate of the fixing support; and an elastic member having an elastic protrusion, the elastic member being fixed to the movable cover module and the elastic protrusion being positioned to correspond to the short plate of the fixing support;

wherein the movable cover module is moved to drive the elastic protrusion to tightly press and fix the short plate of the fixing support when the fixing support is mounted to the frame, wherein the movable cover module comprises a lower base inserted into the frame and an upper base for sliding with respect to the lower base.

2. The screw-less fixing assembly for an interface card according to claim 1, wherein the frame is formed with a post in the accommodating space to face the short plate of the fixing support.

3. The screw-less fixing assembly for an interface card according to claim 2, wherein the lower base has a slot for allowing the post to be inserted therein and two pivots located on both sides of the slot.

4. The screw-less fixing assembly for an interface card according to claim 3, wherein the upper base has two grooves for allowing the pivots to slide therein, and the upper base is configured to pivot toward the outside of the frame with respect to the lower base by using the pivots as centers of rotation.

5. The screw-less fixing assembly for an interface card according to claim 4, wherein the upper base has a hollowed portion between the grooves and the elastic member.

6. The screw-less fixing assembly for an interface card according to claim 5, wherein the elastic member has two hooks inserted into the upper base, and the elastic protrusion is formed between the hooks.

7. The screw-less fixing assembly for an interface card according to claim 6, wherein the frame is provided with a plurality of perforations on its one surface around the accommodating space, and the diameter of each of the perforations is smaller than 5 centimeters.

* * * * *